(12) United States Patent
Ray et al.

(10) Patent No.: US 10,932,072 B2
(45) Date of Patent: Feb. 23, 2021

(54) OPTICAL MEASUREMENT OF DISPLACEMENT

(71) Applicant: Analog Devices, Inc., Norwood, MA (US)

(72) Inventors: Tyler Ray, Hanover, NH (US); Nicholas J. Jakse, Lyndhurst, OH (US); Neal Tait Kurfiss, Somerville, MA (US); Christopher M. Hanna, Arlington, MA (US); Miguel A. Chavez, Cambridge, MA (US); Joshua Berlin, Boston, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 16/375,551

(22) Filed: Apr. 4, 2019

(65) Prior Publication Data

US 2019/0339390 A1 Nov. 7, 2019

Related U.S. Application Data

(60) Provisional application No. 62/665,328, filed on May 1, 2018.

(51) Int. Cl.
*H04R 29/00* (2006.01)
*H04R 23/00* (2006.01)
*G01S 7/48* (2006.01)
*G01S 17/50* (2006.01)

(52) U.S. Cl.
CPC .............. *H04R 29/001* (2013.01); *G01S 7/48* (2013.01); *G01S 17/50* (2013.01); *H04R 23/008* (2013.01)

(58) Field of Classification Search
CPC .......... G01S 17/48; G01S 17/50; G01S 17/88; G01S 7/48; G01S 7/497; H04R 3/007
See application file for complete search history.

(56) References Cited

U.S. PATENT DOCUMENTS

| 5,880,461 | A | * | 3/1999 | Spear | G01J 1/02 |
| | | | | | 250/208.2 |
| 7,149,323 | B2 | | 12/2006 | Yamagishi | |
| 7,609,627 | B2 | | 10/2009 | Beckmöller et al. | |
| 9,967,664 | B1 | | 5/2018 | Quek et al. | |

(Continued)

FOREIGN PATENT DOCUMENTS

| CN | 1270488 | 10/2000 |
| CN | 1418449 | 5/2003 |

(Continued)

OTHER PUBLICATIONS

EN Translation [via Patent Translate] of CN 105792078, 8 pages.

*Primary Examiner* — Michelle M Iacoletti
(74) *Attorney, Agent, or Firm* — Patent Capital Group

(57) ABSTRACT

Systems and methods for optically measuring displacement of an element include an emitter for emitting an optical signal, a first detector for detecting reflections of the optical signal from the element, a second detector for detecting reflections of the optical signal from a raised cover structure, a processor for receiving the detected reflections from the first and second detectors and removing distortions in the detected reflections from the first detector using the detected reflections from the second detector.

20 Claims, 9 Drawing Sheets

(56) References Cited

U.S. PATENT DOCUMENTS

| | | | |
|---|---|---|---|
| 2011/0223581 A1* | 9/2011 | Stobbe | .................. C12M 23/42 435/3 |
| 2014/0285817 A1 | 9/2014 | Taishi et al. | |
| 2018/0023943 A1 | 1/2018 | Lin et al. | |

FOREIGN PATENT DOCUMENTS

| | | |
|---|---|---|
| CN | 104062690 | 9/2014 |
| CN | 105792078 | 7/2016 |
| CN | 107643524 | 1/2018 |

* cited by examiner

OPTICAL MEASUREMENT OF DISPLACEMENT

CROSS REFERENCE TO RELATED APPLICATION

This Application claims priority to U.S. patent application Ser. No. 62/665,328 filed May 1, 2018, which Application is considered incorporated by reference into the disclosure of this Application.

FIELD OF THE DISCLOSURE

The present invention relates to systems and methods for optical measurements of displacement.

BACKGROUND

Many systems are affected by small displacements of various parts, often caused by vibrations. One example is a loudspeaker. A loudspeaker is an electroacoustic transducer, which converts an electrical signal into an audible audio signal. In a dynamic speaker, the electrical signal is applied to a voice coil, which then vibrates, causing a diaphragm attached to the voice coil to move, thereby creating sound waves.

In loudspeaker systems, distortion is a major limitation of large subwoofer drivers, reducing the ability of a driver to extend into deep bass frequencies. Distortion is referred to as the presence of unwanted harmonic frequencies, and is caused by nonlinearities in both the electro-mechanical voice coil system and the speaker's diaphragm. The distortion effect becomes worse with lower frequency, and thus limits the lowest frequency at which a loudspeaker can practically output audio while maintaining reasonably low distortion. If the loudspeaker is modeled as a dynamical system, with the input an audio voltage input, and the output the displacement of the loudspeaker cone, feed-forward and/or feedback control techniques can be used to correct for the distortions. Traditional methods to control loudspeakers for the purpose of reducing distortion rely on integration of velocity and/or acceleration measurements to determine displacement, and do not directly measure displacement. This results in an accumulation of error in displacement measurements which is not acceptable for feed-forward methods of controlling loudspeakers.

Overview

Systems and methods for optically measuring displacement are disclosed. In one implementations, an optical system for measuring displacement of an element, including an emitter positioned on a first surface for emitting an optical signal, a raised structure displaced from the first surface, a first detector for detecting reflections of the optical signal from the element, a second detector for detecting reflections of the optical signal from the raised cover structure, and an amplifier for receiving the detected reflections from the first and second detectors and removing distortions in the detected reflections from the first detector using the detected reflections from the second detector. In some examples, the amplifier removes distortions that are caused by variations in the optical signal emitted from the emitter. In some implementations, the optical system further includes a bandpass filter for filtering the detect reflections from the first and second detectors.

In some examples, the optical system is used in a loudspeaker, and the element is a loudspeaker dust cover and first surface is the yoke of the loudspeaker. In other examples, the optical system is used in pumps such as hydraulic valves.

In another implementation, a method for optically measuring displacement of an element, includes emitting an optical signal from an emitter mounted on a first surface, detecting reflections of the optical signal reflected off the element, detecting reflections of the optical signal reflected off a raised cover structure displaced from the first surface, inputting the detected reflections from the first detector and the detected reflections from the second detector to a lock-in amplifier, and, at the lock-in amplifier, removing distortions in the detected reflections from the first detector using the detected reflections from the second detector. In some examples, the lock-in amplifier removes distortions that are caused by variations in the optical signal emitted from the emitter. In some implementations, the method of further includes bandpass filtering the detected reflections from the first and second detectors to remove noise outside a selected frequency range.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Systems and methods are provided for of measuring the displacement with high accuracy and precision using a reflective optical sensor. In one example, the systems and methods can be used for measuring the displacement of a loudspeaker cone. In various implementations, the system includes a reference detector, and a homodyne (lock-in) approach is used to mitigate the effects of external noise. External noise can include noise caused by power lines, temperature changes, and lifetime drift. The systems and methods provided also minimize the impact of inherent electronic noise.

The system for measuring displacement includes an optical sensor having an emitter, such as a light-emitting diode (LED), two optical detectors (photodiodes), and an electronic acquisition system. The electronic acquisition system can be used to control the optical sensor. In some implementations, the electronic acquisition system is the lock-in amplifier and the digital signal processor (DSP) that senses the output of the optical sensor to convert it into a linear displacement. In other implementations, a microcontroller (or other specialized dedicated hardware) is used to sense the output of the optical sensor and convert it to a linear displacement. In some implementations, analog circuitry is used to sense the output of the optical sensor and convert it to a linear displacement.

Figure 1:
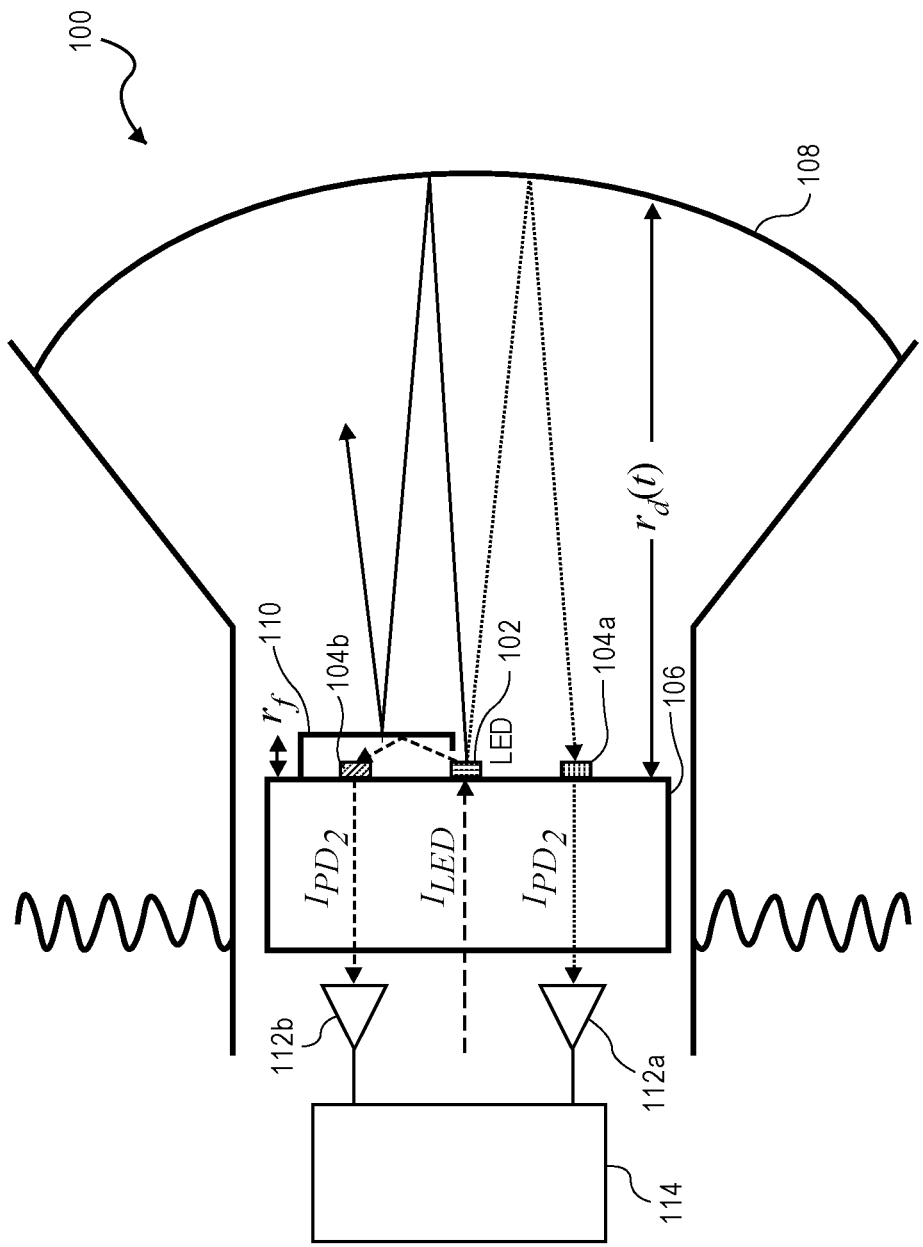
FIG. 1 is a diagram illustrating an optical displacement measurement system, according to some embodiments of the disclosure.

FIG. 1 shows a diagram illustrating an optical displacement measurement system in a loudspeaker, according to some embodiments of the disclosure. The emitter 102 and first 104a and second 104b optical detectors are mounted on the yoke 106 of the loudspeaker. An optical signal is emitted from the emitter 102 such that it reflects off of the loudspeaker's dust-cap 108, which moves relative to the yoke 106 when the loudspeaker is actuated. The first detector 104a is positioned so that it directly measures the optical signal that is reflected off the dust-cap 108. The second detector 104b is positioned underneath a raised opaque cover structure 110 that blocks signals reflected off of the dust-cap 108, and effectively limits incoming signals to light emitted directly from the emitter 102. Thus, the second detector 104b receives the reflections of optical signals from the emitter 102, reflected off the raised opaque cover structure 110. In this way, the second detector 104b is used to measure variation in the output from the emitter 102.

The optical cover structure 110 shown in FIG. 1 is a flat surface positioned parallel to the yoke and positioned a distance of $r_f$ away from the yoke. In various examples, the distance $r_f$ is about 1 mm, about 2 mm, about 3 mm, about 4 mm, about 5 mm, about 10 mm, less than about 1 mm, or greater than about 10 mm. The cover structure extends from the emitter 102 past the second detector 104b and beyond the detector there is an exterior side wall extending from the yoke to the cover structure, and positioned approximately perpendicular to the yoke. In some implementations, as shown in FIG. 1, the interior side of the cover structure, close to the emitter 102, has an interior half wall extending part of the way from the cover structure toward the emitter 102. The cover structure, exterior side wall, and interior half wall are opaque, and effectively block signals from outside the cover structure from entering the structure. The signals from the emitter 102 enter the cover structure through the small opening in the structure adjacent to the emitter 102. In various implementations, the cover structure 110 is semicircular, wedge-shaped, square, rectangular, circular, oval-shaped, or any other suitable shape.

The reflected signals received at the first 104a and second 104b detectors are each amplified at first 112a and second 112b amplifiers, respectively. The amplified reflected signals are transmitted to a processing unit 114 that removes noise from the first reflected signal. In particular, using measurements from the second detector 104b, measurements of reflected signals received at the first detector 104a are corrected to remove deviations due to variations in the output from the emitter 102. Removing deviations in the reflected signal received at the first detector 104a caused by deviations in the signals output from the emitter 102 results in much more accurate displacement measurements.

In some implementations, the emitter 102 is a light emitting diode (LED). The optical signal output from an LED has a strong dependence on temperature, lifetime, and other factors. The variation in optical output of an LED leads to inaccurate optical measurements. The effect of the variation in optical output from an LED can be removed using the optical displacement measurement system 100, including the reference detector. Removing the effect of the variation in LED optical output results in more precise measurements.

The effects of external and inherent noise are reduced through the use of a synchronous detection (lock-in) approach, improving accuracy. In particular, the emitter 102 is modulated at a reference frequency and the detector channels at the detectors 104a, 104b are "locked-in" to the reference frequency such that they ignore noise at other frequencies. In some implementations, the reference frequency is above the audio frequency range. In one example, the reference frequency is 60 kHz. In other examples, the reference frequency can be any selected frequency.

According to various implementations, the lock-in amplifier and the bandpass filters in the lock-in amplifier inherently remove DC offsets that can impact the division. The modulation and demodulation removes sources of variation such as photodiode dark current, op amp offsets, and digital offsets in the microcontroller/DSP. According to some examples, offsets are removed because offsets affect both the precision (noise) and the accuracy to absolute position as well.

According to some implementations, the optical displacement measurement system is positioned on the top piece of a speaker, behind the dust cap. In some implementations, the optical displacement measurement system is positioned on top of the pole piece of a speaker. In some examples, the optical displacement measurement system serves as a reference, inside the magnetic circuit. In some implementations, the wiring of the electronics is threaded through a hole in the pole piece of a speaker. In other implementations, the wiring is threaded through a different hole. In some implementations, the connector is mounted on the pole piece of the magnetic circuit of the loudspeaker.

In some implementations, the electronics PCB is coupled to the pole piece. Coupling the electronics PCB to the pole piece allows for an absolute positioning of the optical displacement measurement system. According to some implementations, a system is designed to allow laminar and/or non-obstructing wind flow to avoid unwanted distortions caused by the added electronics. In some implementations, a thermal sensor is mounted on the electronics to derive the overall temperature of both the magnetic circuit and the voice coil. In some implementations, thermos chromic materials are used.

Figure 2:
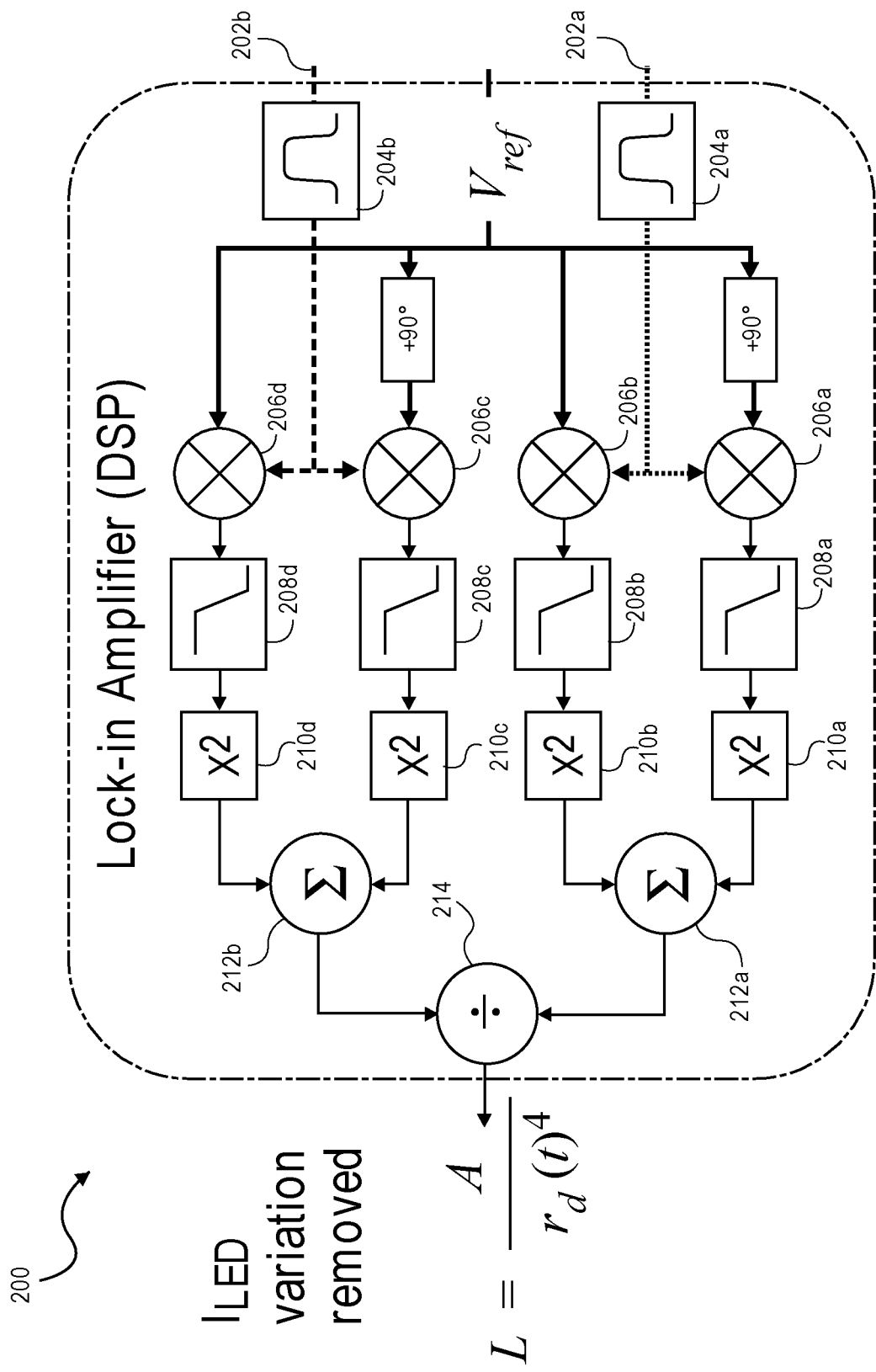
FIG. 2 is a diagram illustrating a lock-in amplifier, according to some embodiments of the disclosure.

FIG. 2 is a diagram illustrating a lock-in amplifier 200, according to some embodiments of the disclosure. The lock-in amplifier 200 includes first 202a and second 202b input channels. The signals received at the first 202a and second 202b input channels are each bandpass filtered at first 204a and second 204b bandpass filters. The bandpass filters filter out any input signals outside of a small range that includes the reference frequency, thereby focusing the signals to frequencies close to the reference frequency. The bandpass filtered signals are each split for IQ demodulation from the reference frequency, and the split signals are input to respective mixers. The signal from the first bandpass filter 204a is sent to first 206a and second 206b mixers. The signal received from the second band-pass filter 204b is sent to third 206c and fourth 206d mixers. The second 206b and fourth 206d mixers receive the reference frequency as an input, and mix the reference frequency with the signal received from the band-pass filters. The first 206a and third 206c mixers receive a 90 degree modulated reference frequency, and mix the modulated reference frequency with the signal received from the band-pass filters. In other implementations, the Vref in FIG. 2 is replaced with an oscillator, and instead of the reference frequency, the mixers receive a signal from the oscillator.

The output from each of the mixers 206a, 206b, 206c, 206d is low pass filtered at low pass filters 208a, 208b, 208c, 208d to further reduce high-frequency noise. The output from the low pass filters 208a, 208b, 208c, 208d is squared at elements 210a, 210b, 210c, and 210d. The outputs from elements 210a and 210b are summed at summer 212a, and the outputs from elements 210c and 210d are summed at summer 212b. According to various implementations, lock-in amplifiers perform the mathematical operation of the inner product, for which an integral over many periods of the sine-wave is demodulated. According to some examples, the low pass filters 208a, 208b, 208c, 208d provide an implementation of the integration component of the inner product.

The application of distortion removal in practice uses +/−2 kHz of bandwidth, and by moving this band so that it is modulated at 60 kHz, the measurement is moved far away from low frequency (1/f) noise, power lines at 60 Hz, and other common low frequency interferers. This has a profound effect on the noise floor and thus significantly improves the accuracy of the measurement. After both input channels are passed through their lock-in amplifier channels, the signals are divided at divider 214, resulting in an output that has dependence on the loudspeaker cone displacement, and no other time-varying factors.

The lock-in amplifier 200 shown in FIG. 2 is one implementation of a lock-in amplifier. In other implementations, an optical displacement measurement system, such as that shown in FIG. 1, can be connected to any other type of lock-in amplifier.

In a feed-forward displacement measurement systems as described herein, linearity is less important than in feedback systems. According to various implementations, the systems and methods provided measure displacement with high accuracy and precision, and can tolerate nonlinearities. The optical measurements are inherently nonlinear. In particular, a light emitter modeled as a point source loses intensity with $1/r^2$, where r is the distance from the emitter, and when reflected off of a surface (modeled as a second point source), there is another loss of $1/r^2$ on the way back towards the detector. Modeling the reflection surface and detector as areas instead of point sources improves linearity slightly: light is reflected and detected instead as a $\tan(1/r)/r$, which is very close to $1/r^2$. However, loudspeaker excursions are generally a small fraction of the distance between the emitter/detector and the dust-cap. If the fraction (loud speaker excursion compared to distance between the emitter/detector and the dust-cap) is small enough, the measurement is approximately linear in a small-signal sense. In a small-signal model, increases in area of the reflector or the detector have insignificant effects on linearity, but increasing the ratio of the distance between the optical sensor and dust-cap relative to the loudspeaker excursions has a major effect on improving linearity. In particular, the ratio of the distance between the optical sensor and dust-cap relative to the loudspeaker excursions is such that nonlinearities are small enough for a look-up table to be used effectively. Lock-in amplifiers are implemented digitally on a device such as a digital signal processor (DSP), so a look-up table is easily included in the design.

Another aspect of traditional feedback control systems is system delay for the feedback. However, in the feed-forward systems provided herein, delay is not necessary.

Lock-in amplifiers can be implemented with low group-delay data converters, making use of this measurement in feedback control practical. Minimizing delay through a feedback loop helps to maintain stability. The position sensor is used to correct the position of a loudspeaker or other element in direct feedback.

Figure 3:
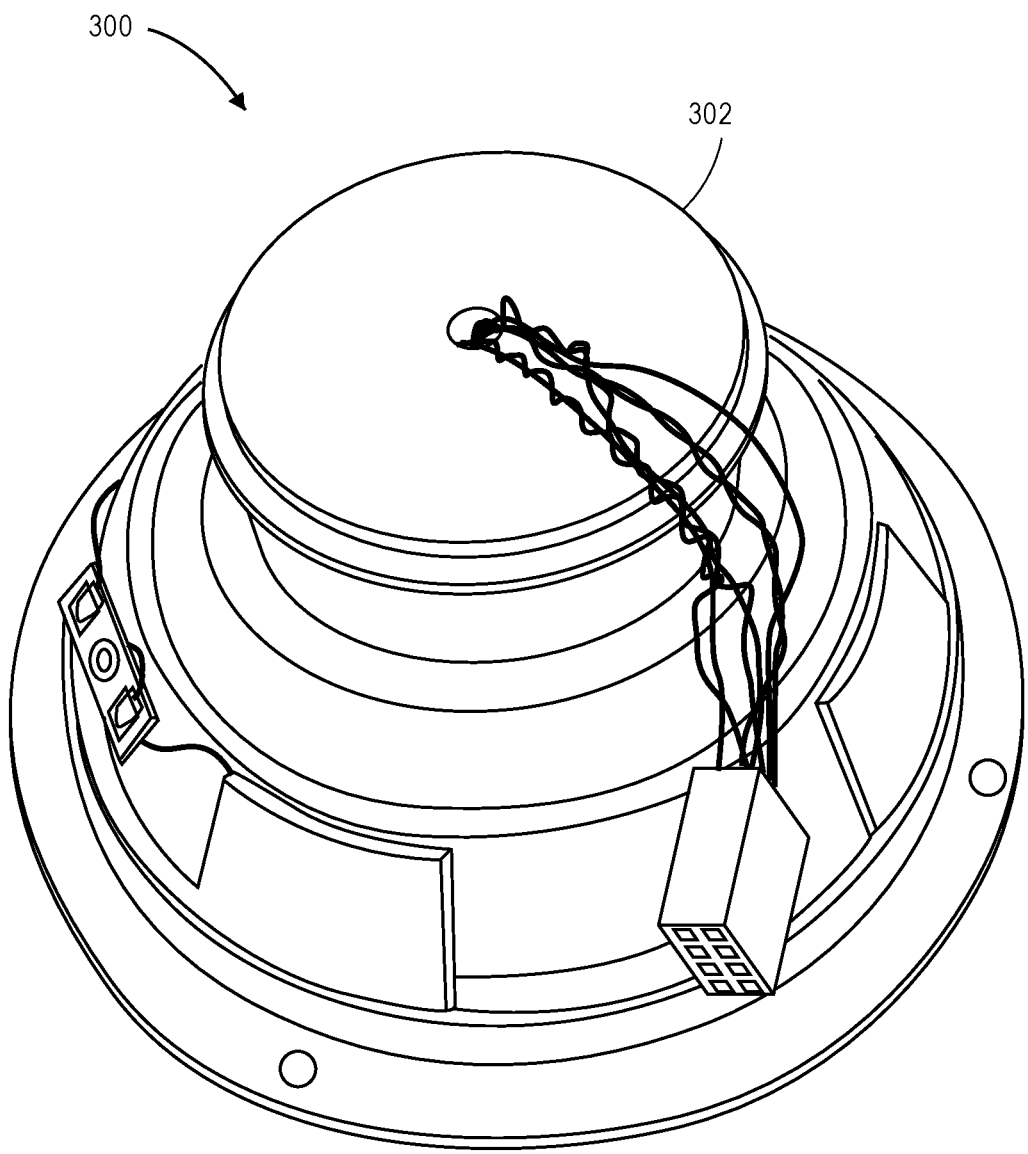
FIG. 3 is a diagram illustrating a rear angle view of a loudspeaker cone, according to some embodiments of the disclosure.

FIG. 3 shows a rear angle view of the back of a speaker cone 300. The back of the speaker cone 300 includes a small aperture in the base of the speaker, which traverses the yoke. Wires 302 to and from the displacement measurement system are threaded through the aperture, and the displacement measurement system is connected to a lock-in amplifier outside the speaker via the wires. In other implementations, the displacement measurement system is wirelessly connected to the lock-in amplifier. In further implementations, the lock-in amplifier is positioned within the speaker.

Figure 4:
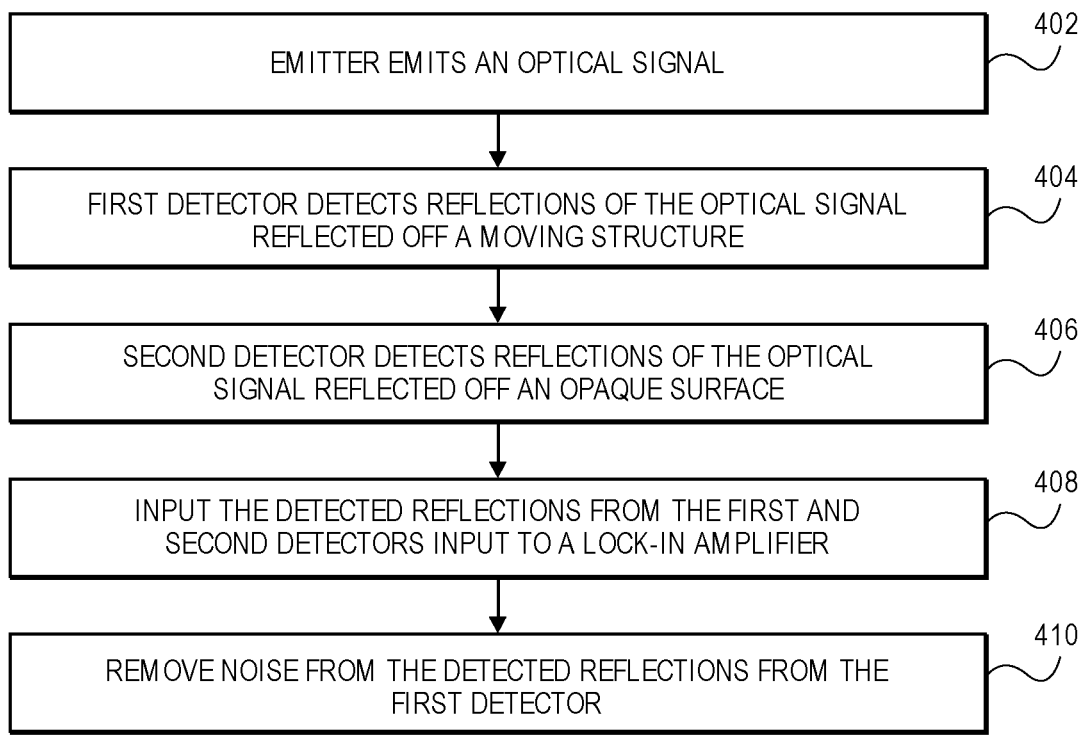
FIG. 4 is a diagram illustrating a method for optically measuring displacement, according to some embodiments of the disclosure.

FIG. 4 is a diagram illustrating a method 400 for optically measuring displacement. The method begins with an emitter emitting an optical signal at step 402. At step 404, a first detector detects reflections of the optical signal reflected off a vibrating structure. At step 406, a second detector detects reflections of the optical signal reflected off an opaque cover structure. At step 408, the detected reflections from the first detector and the detected reflections from the second detector are input to a lock-in amplifier. At step 410, using the detected reflections from the second detector, the lock-in amplifier removes distortions in the detected reflections from the first detector. In particular, the lock-in amplifier removes variations that are caused by variations in the optical signal emitted from the emitter.

According to some implementations, the method 400 further includes a calibration step. Calibrating the system allows for measurement of absolute distance from the sensor. According to various implementations, the result of applying the lock in amplifier to the first and second channels, and then dividing the two, is that a measured quantity is obtained that varies with distance (and does not vary with other effects such as temperature, or the light emitter changing). While the measured quantity varies with distance, it does not measure distance absolutely. To determine absolute distance, a calibration with some other sensor is implemented. Once a calibration has been applied, the disclosed optical sensor provides an accurate measure of absolute distance.

According to some implementations, the calibration method is a polynomial fit. In one example, a fourth order polynomial fit is used. In some implementations, the calibration method is a look-up table point-by-point calibration that directly maps measured intensity from the lock-in output division to distance.

According to various implementations, the signal output from the lock-in amplifier can be used in a feed-forward system to measure displacement of the vibrating structure. In one example, the vibrating structure is a speaker dust-cap. In some implementations, the optical displacement measurement system is used for autofocus for measuring a camera lens position relative to the imager.

In some implementations, the optical displacement measurement system is configured to sense transducer excursion (a distance measurement sensed optically), and is used in noise cancelling headphones as a way to feed distance information into the noise cancelling algorithm and predict acoustic feedback scenarios. Current noise cancelling algorithms use an audio back path that causes instability, which can be avoided with an optically displacement measurement system as described herein.

Speakers sometimes have unstable regions near their resonance frequencies caused by non-linear asymmetry. This cannot be detected by traditional current and voltage sensors because they are caused by the mechanical non-linarites, not the electrical ones. In some implementations, sensing absolute position helps indicate if the speaker is in a non-stable state.

For headphones, the noise cancelling algorithm relies on a closed system control loop. Thus, the noise cancelling algorithm is governed by the limitations of a close loop control system, including regions of instability. More specifically, if the padded cover of an existing noise cancelling system is removed and the speaker and microphone are closer to the ear, the close proximity causes the control loop to become unstable. Users hear a squealing noise, which may cause users to become temporarily deaf and can cause permanent damage a user's hearing. A similar phenomena can be experienced by simply pressing the headphone to the ear. In some implementations, an optical sensor detects ear cup-to-ear proximity (the distance between the ear cup and the ear), and serves as a flag to notify the algorithm or system to avoid or remove instabilities.

Figure 5C:
FIGS. 5A-5C are diagrams illustrating various cover structures, according to some embodiments of the disclosure.
Figure 5B:
Figure 5A:

FIGS. 5A-5C are diagrams illustrating various cover structures, according to some embodiments of the disclosure. The first cover structure, shown in FIG. 5A, is a rectangular structure, fully enclosed on the top side with a flat edge perpendicular to the yoke, with a flat cover, and partially enclosed on the bottom side. The second cover structure, shown in FIG. 5B, has a fully enclosed top side with a flat edge perpendicular to the yoke, with a curved cover to curves downward toward the bottom edge of the cover. The third cover structure, shown in FIG. 5C, has a fully enclosed top side with a flat edge perpendicular to the yoke, with a curved, elliptical-shaped cover curving upwards and back downwards toward the bottom edge of the cover. The covers in FIGS. 5A, 5B, and 5C include an opening along the bottom edge for light from the LED to enter the covered structure and reflect directly to a sensor from a static cover structure.

Figure 6:
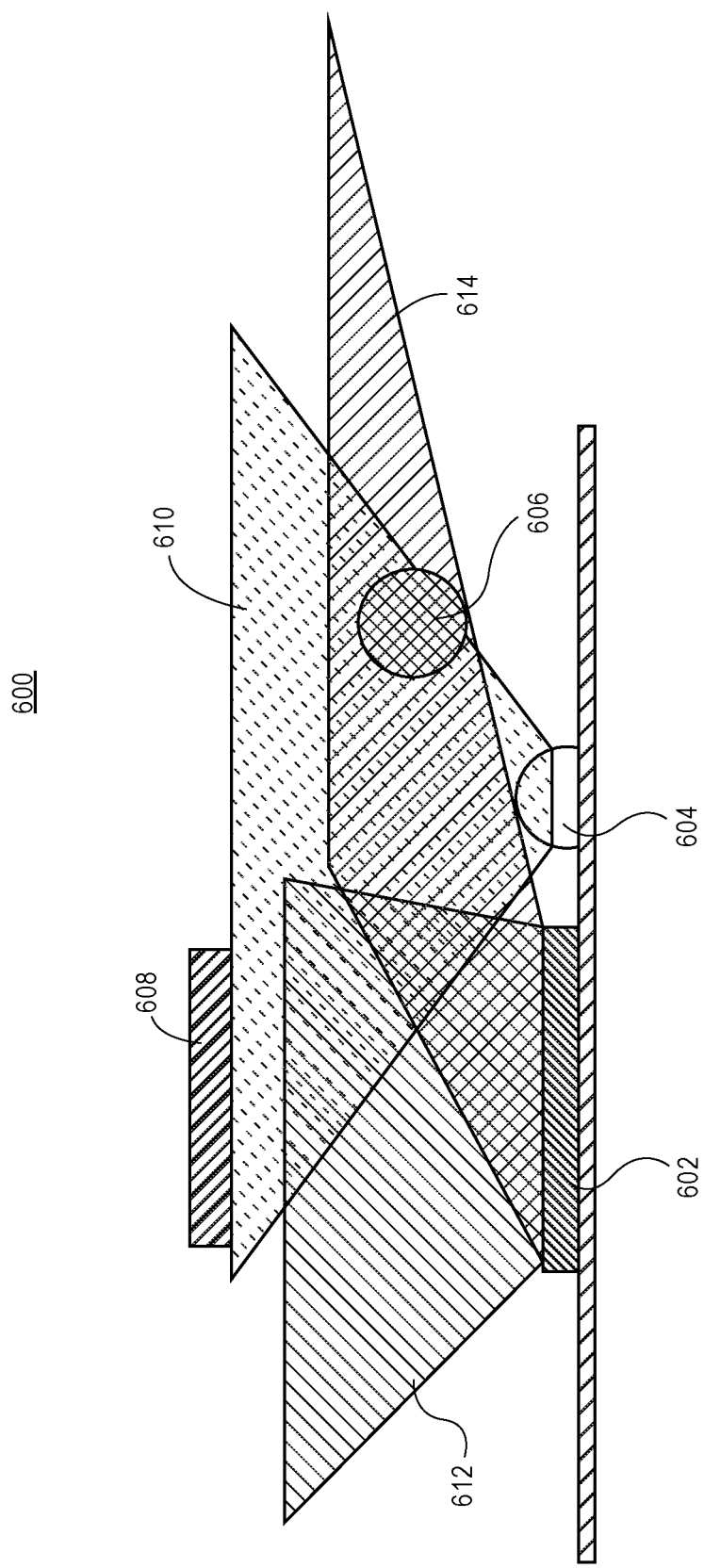
FIG. 6 is a diagram illustrating a single detector with two viewing regions, according to some embodiments of the disclosure.

FIG. 6 is a diagram illustrating a system 600 having single detector 602 with two viewing regions, according to some embodiments of the disclosure. As shown in FIG. 6, the system 600 include a light source 604, a reflector 606, and an object 608. The light source emits light in an area 610. The detector 602 has two viewing regions: a first viewing region 612 and a second viewing region 614. The detector 602 captures information from the two different regions. The first viewing region 612 captures a region above and to one side of the detector 602, including the object 608. The second viewing region 614 captures a region above and to the other side of the detector 602, including the reflector 606. In various examples, the reflector is a rigid reflector. The first 612 and second 614 viewing regions overlap.

The object 608 may be moving, and the detector 602 detects movement of the object 608. In various implementations, the object 608 moves perpendicular to the detector 102, such that the object 608 moves closer to the detector and then further away from the detector. In some examples, the motion of the object 608 is a vibration.

The data collected from the first viewing region 612 is compared to the data collected from the second viewing region 614. The ratio of the measurements from the first viewing region 612 to the second viewing region 614 can be used to determine the measurements of the movement of the object 608.

According to various implementations, the detector 602 is a dual position optical sensor. In some implementations, the detector 602 includes more than one sensor on an integrated dye. In other implementations, the detector is a single sensor that captures measurements from multiple separate objects independently. According to some implementations having the sensors in a single dye eliminates the potential for differences between sensors, such as differences caused by drift.

Figure 7:
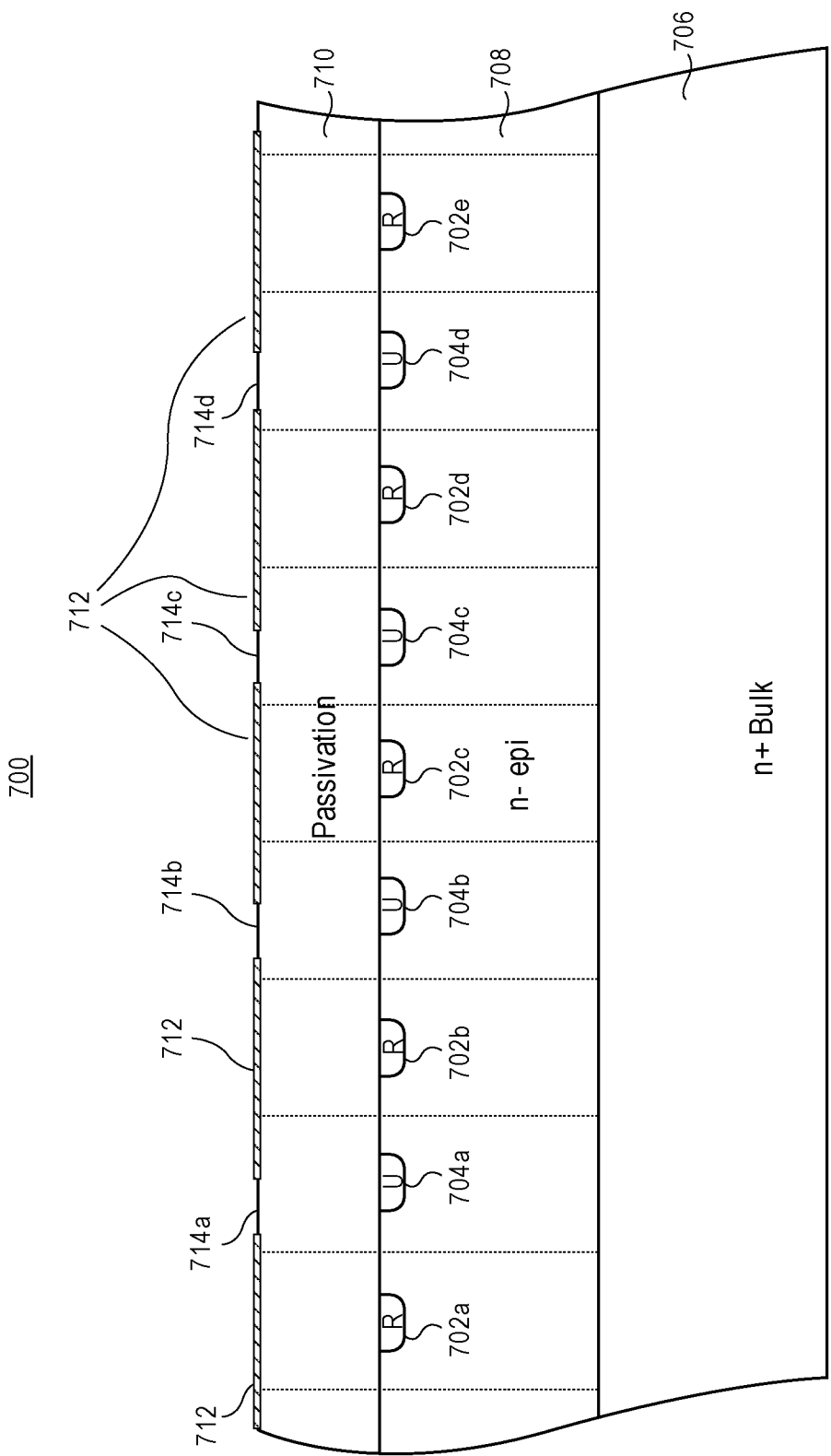
FIG. 7 is a diagram illustrating a dual position optical sensor, according to some embodiments of the disclosure.

FIG. 7 is a diagram illustrating a dual position optical sensor 700, according to some embodiments of the disclosure. FIG. 7 shows a cross-section of a sensor 700. The sensor 700 includes separate anodes and cathodes. As shown in FIG. 7, the sensor 700 includes first 702a-702e and second 704a-704d sensor elements. The first sensor elements 702a-702e are connected in a comb-like structure. Similarly, the second sensor elements 704a-704d are connected in a comb-like structure. The sensor 700 includes a wafer layer 706, an epitaxial layer 708, and passivation layer 710. On top of the passivation layer 710 is a light-blocking layer having multiple gaps 714a-714d. The gaps 714a-714d allow light to pass through. In one example, the light-blocking layer has 8 mm wide light-blocking portions and 2 mm wide gaps 714a-714d in between the light-blocking portions.

The first sensor elements 702a-702e sense at an angle to the right. The second sensor elements 704a-704d sense upwards. The angle of light received at the sensor 700 changes as it enters the passivation layer 710. For example, at the gap 714a in FIG. 7, light hitting the passivation layer 710 at a 45 degree angle shifts to a 28 degree angle (with respect to perpendicular) when it enters the passivation layer 710. The light entering the passivation layer 710 through the gap 714a is received at the first sensor element 702a, which captures measurements from its right. Similarly, light entering the passivation layer 710 from the left through the gap 714b shifts angles as it enters the passivation layer 710 and is received at the second sensor element 704b, which captures measurements from above.

Figure 8:
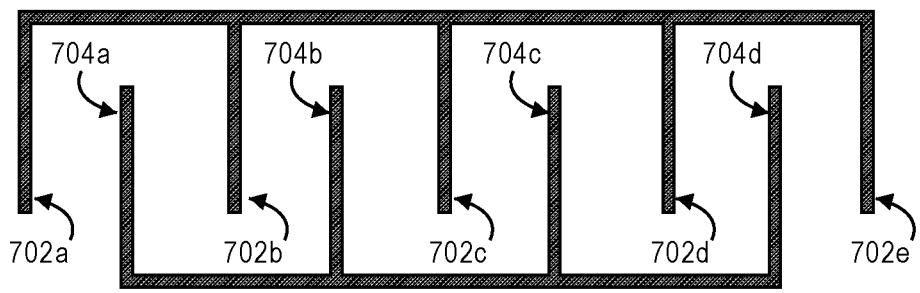
FIG. 8 is a diagram illustrating a sensor layout for a dual position optical sensor, according to some embodiments of the disclosure.

FIG. 8 is a diagram showing a top-view 800 of the first 702a-702e and second 704a-704d sensor elements of FIG. 7. As shown in FIG. 8, the first 702a-702e and second 704a-704d sensor elements are comb-shaped, such that the individual sensor elements of each set are connected, while in the center of the optical sensor, the first 702a-702e and second 704a-704d sensor elements alternate with each other.

Figure 9:
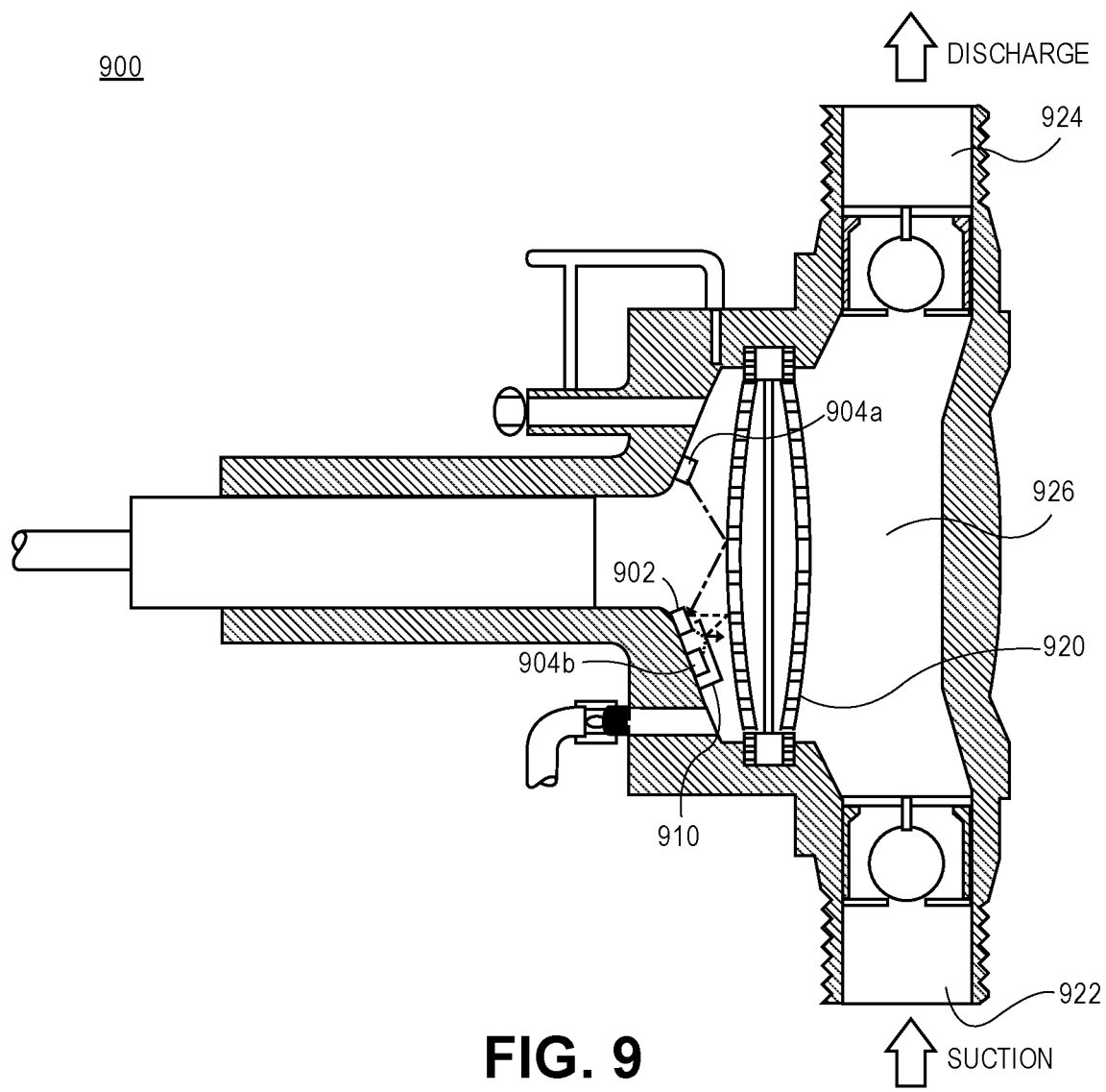
FIG. 9 is a diagram illustrating a diaphragm pump including an optical measurement system, according to some embodiments of the disclosure.

FIG. 9 is a diagram illustrating a diaphragm pump 900 including an optical measurement system, according to some embodiments of the disclosure. An optical displacement measurement system can be added to a diaphragm pump to measure movement of the diaphragm 920. The diaphragm pump includes a diaphragm 920, a suction inlet 922, a discharge outlet 924, and a hydraulic fluid chamber 926. Connected to the hydraulic fluid chamber are a refill valve, a relief valve, and an air-bleed valve. The optical displacement measurement system is positioned outside the hydraulic fluid chamber 926, on the other side of the diaphragm 920. The optical displacement measurement system includes an LED 902, first 904a and second 904b sensors, and a cover structure 910. The optical displacement measurement system is positioned such that light from the LED 902 is reflected off the diaphragm 920. The first 904a and second 904b sensors receive reflected light from the LED 902. The first sensor 904a receives LED light reflected off the diaphragm 920. The second sensor 904b is positioned under the cover structure 910 and receives LED light reflected off the interior of the cover structure. As described above with respect to FIGS. 1 and 2, the optical displacement measurement system uses the data from the first 904a and second 904b sensors to determine displacement of the diaphragm 920. In other examples, the light is reflected off another moving surface of the pump.

In some implementations, the diaphragm is moved by a piezoelectric element that flexes. In some examples, the optics are mounted on the frame and are directed at the diaphragm. In one example, the total travel of the diaphragm is ~1 mm and there is a 5×5 mm surface on the moving component for light to reflect off of.

In operation, the plunger moves in a reciprocating motion to induce movement of the diaphragm. The diaphragm pump operates as a positive displacement pump, and a volume of liquid is physically collected into a collection chamber on the right side of the diaphragm through the suction inlet when the diaphragm moves to the left. When the plunger induces movement of the diaphragm to the right, the volume of liquid in the collection chamber is pushed out the discharge outlet of the pump. Thus, during each cycle of pump operation, a volume of liquid enters the collection chamber through the suction inlet and is subsequently pushed out of the collection chamber through the discharge outlet. In various implementations, the volume of liquid is constant regardless of the resistance to flow offered by the system the pump is in. Thus, a regular discrete dose of liquid is delivered by the positive displacement pump during a discharge portion of each cycle of the pump operation, while no liquid is delivered during a suction portion of each cycle of the pump operation. In some examples, a pump can have several chambers, with overlapping delivery of liquid among individual chambers. A optical displacement measurement system can measure movement of the diaphragm and can be used to regulate flow.

In various examples, the diaphragm pump includes a check valve in each of the suction and discharge ports, allowing flow in only one direction. In one example, during the suction part of the cycle, the piston moves to the left, causing the check valve in the suction line between the reservoir and the pump cylinder to open and admit water from the reservoir. During the discharge part of the cycle, the piston moves to the right, seating the check valve in the suction line and opening the check valve in the discharge line. The volume of liquid moved by the pump in one cycle (one suction stroke and one discharge stroke) is equal to the change in the volume of the cylinder as the piston moves from its farthest left position to its farthest right position. Note that the pump construction eliminates any contact between the liquid being pumped and the source of energy. This eliminates the possibility of leakage.

Variations and Implementations

In the discussions of the embodiments above, the capacitors, dividers, inductors, resistors, amplifiers, switches, digital core, transistors, clocks and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the clocking and filtering functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended example embodiments. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended example embodiments. The description and drawings are, accordingly, to be regarded in an illustrative rather than in a restrictive sense.

Note that the activities discussed above with reference to the FIGURES are applicable to any integrated circuits that involve signal processing, particularly those that use sampled analog, some of which may be associated with processing real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to clocking in sampled analog systems, illustrate only some of the possible clocking functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended examples.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. An optical system for measuring displacement of an element, comprising:
   an emitter positioned on a first surface configured to emit an optical signal;
   a raised cover structure displaced from the first surface, wherein the raised cover structure is a second surface positioned between a portion of the first surface and the element;
   a first detector configured to detect reflections of the optical signal from the element;
   a second detector positioned between the portion of the first surface and the raised cover structure configured to detect reflections of the optical signal from the raised cover structure; and
   a processor configured to receive signals corresponding to the detected reflections from the first and second detectors and remove distortions in the signals corresponding to detected reflections from the first detector using the signals corresponding to the detected reflections from the second detector.

2. The optical system of claim 1, wherein the element is a loudspeaker dust cover and the first surface is the yoke of the loudspeaker.

3. The optical system of claim 1, wherein the processor is configured to remove distortions that are caused by variations in the optical signal emitted from the emitter.

4. The optical system of claim 1, further comprising a bandpass filter configured to filter the detected reflections from the first and second detectors.

5. The optical system of claim 1, wherein the raised cover structure second surface is a flat surface positioned parallel to the first surface.

6. The optical system of claim 1, wherein the emitter is a light emitting diode (LED).

7. The optical system of claim 1, wherein the processor is further configured to correct the signals corresponding to detected reflections from the first detector to remove deviations caused by variations in the optical signal.

8. The optical system of claim 7, wherein the processor is configured to use the signals corresponding to detected reflections from the second detector to correct the signals corresponding to detected reflections from the first detector.

9. The optical system of claim 1, wherein the element is a diaphragm in a pump system.

10. The optical system of claim 1, further comprising an amplifier configured to amplify the detected reflections from the first and second detectors.

11. A method for optically measuring displacement of an element, comprising:
- emitting an optical signal from an emitter mounted on a first surface;
- detecting reflections of the optical signal reflected off the element at a first detector;
- detecting reflections of the optical signal reflected off a raised cover structure displaced from the first surface at a second detector, wherein the raised cover structure is a second surface positioned between a portion of the first surface and the element;
- inputting the detected reflections from the first detector and the detected reflections from the second detector to a lock-in amplifier; and
- at the lock-in amplifier, generating an output signal by removing distortions in the detected reflections from the first detector using the detected reflections from the second detector.

12. The method of claim 11, further comprising measuring displacement of the element using the output signal.

13. The method of claim 12, wherein measuring displacement of the element comprises measuring displacement of a loudspeaker dust cover.

14. The method of claim 12, wherein measuring displacement of the element comprises measuring displacement of a diaphragm in a pump system.

15. The method of claim 11, wherein the lock-in amplifier removes distortions that are caused by variations in the optical signal emitted from the emitter.

16. The method of claim 11, further comprising bandpass filtering the detected reflections from the first and second detectors to remove noise outside a selected frequency range.

17. An optical system for measuring displacement of an element, comprising:
- an emitter positioned on a first surface configured to emit an optical signal;
- a reflector configured to reflect emitted optical signals, wherein the reflector is positioned between a portion of the first surface and the element;
- a dual position detector for detecting reflections of the optical signal, the dual position detector including:
  - a first sensor element configured to detect reflections of the optical signal from a first field of view, wherein the first field of view includes the element, and
  - a second sensor element configured to detect reflections of the optical signal from a second field of view, wherein the second field of view includes the reflector; and
- a processor configured to receive signals corresponding to the detected reflections from the first and second sensor elements and remove distortions in the signals corresponding to detected reflections from the first sensor element using the signals corresponding to detected reflections from the second sensor element.

18. The optical system of claim 17, wherein the element is a loudspeaker dust cover and the first surface is the yoke of the loudspeaker.

19. The optical system of claim 17, wherein the element is a diaphragm in a pump system.

20. The optical system of claim 17, further comprising a bandpass filter configured to filter the detected reflections from the first and second sensor elements.

* * * * *